(12) United States Patent
Hepner et al.

(10) Patent No.: US 7,134,029 B2
(45) Date of Patent: Nov. 7, 2006

(54) COMPUTER-COMPONENT POWER-CONSUMPTION MONITORING AND CONTROL

(75) Inventors: David F. Hepner, San Jose, CA (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 482 days.

(21) Appl. No.: 10/702,410

(22) Filed: Nov. 6, 2003

(65) Prior Publication Data

US 2005/0102539 A1   May 12, 2005

(51) Int. Cl.
*G06F 1/26* (2006.01)
*G06F 1/32* (2006.01)
*G06F 1/28* (2006.01)

(52) U.S. Cl. .................. 713/300; 713/320; 713/322
(58) Field of Classification Search ................ 713/300, 713/320, 322, 323
See application file for complete search history.

(56) References Cited

U.S. PATENT DOCUMENTS

| | | | |
|---|---|---|---|
| 5,388,265 A | 2/1995 | Volk ........................... 395/750 |
| 5,485,127 A | 1/1996 | Bertoluzzi et al. ............ 331/69 |
| 5,737,616 A | 4/1998 | Watanabe .............. 395/750.08 |
| 5,758,171 A * | 5/1998 | Ramamurthy et al. ...... 713/300 |
| 5,778,237 A | 7/1998 | Yamamoto et al. .... 395/750.04 |
| 5,913,068 A | 6/1999 | Matoba ................. 395/750.04 |
| 5,996,084 A | 11/1999 | Watts .......................... 713/323 |
| 6,073,244 A * | 6/2000 | Iwazaki ...................... 713/322 |
| 6,167,524 A | 12/2000 | Goodnow et al. .......... 713/300 |
| 6,182,232 B1 | 1/2001 | Klein ......................... 713/340 |
| 6,260,151 B1 | 7/2001 | Omizo et al. ............... 713/324 |
| 6,415,388 B1 | 7/2002 | Browning et al. .......... 713/322 |

OTHER PUBLICATIONS

IBM TDB Mar. 1984 vol. 26 No. 10B p. 5371-5372: "Self-Adjusting Overcurrent Detection for Current Mode, Regenerative Driven, High Frequency Power Supplies".

* cited by examiner

*Primary Examiner*—Lynne H. Browne
*Assistant Examiner*—Stefan Stoynov
(74) *Attorney, Agent, or Firm*—Kunzler & Associates (57) ABSTRACT

An apparatus for regulating power allocated to components within a computer system includes a sensor to sense power drawn by a first device within a computer system, the first device having device resources needed to satisfy functional demand required of the first device. A second sensor is provided to sense power drawn by a second device within the computer system, the second device having device resources needed to satisfy functional demand required of the second device. A power-monitoring module is provided to monitor the power drawn and the functional demand required of the first and second devices. A system control module, operably connected to the power-monitoring modules, is provided to regulate power allocated to the first and second devices by optimizing use of the device resources in accordance with the temperature, power drawn, and respective functional demands of the devices.

23 Claims, 6 Drawing Sheets

Prior Art

COMPUTER-COMPONENT POWER-CONSUMPTION MONITORING AND CONTROL

BACKGROUND OF THE INVENTION

1. The Field of the Invention

This invention relates to digital computers, and more particularly, to unique apparatus and methods for conserving and managing power allocated to expansion cards and other devices within a computer system.

2. The Relevant Art

In an effort to increase the functionality, flexibility, and utility of today's personal computers, workstations, servers, and the like, expansion buses such as the PCI (Peripheral Component Interconnect) bus have been provided to enable a user to mix and match desired add-on components in a computer system. Expansion buses typically interface with the main bus or local bus connected to a CPU through a bridge or other interface device. Thus, an expansion bus may operate at a different clock speed and may use different data transfer protocols than are used by a CPU and associated components connected to a local bus.

As add-on or expansion components continue to have improved performance, various existing expansion bus technologies may be reaching their limits in terms of data rates, power consumption, expandability, and the like. Moreover, as performance of these components continues to increase, the amount of power these components consume becomes an important issue to proper operation of an expansion bus. Most buses are designed to allocate pre-determined amounts of power to components connected thereto. For example, the PCI bus specification allocates 25 watts to each connected device. Nevertheless, certain components may exceed this rated allotment at times, thereby overloading the bus and associated power supply.

Power supplies are often expensive compared to other components in a computer system. The cost of a power supply may be directly related to its rated wattage. Thus, providing a power supply that is sufficient for a system, with little excess capacity, may contribute to keeping the cost of computers relatively low. Moreover, apparatus and methods used to decrease power consumed by components in a computer may enable a computer to have a lower rated power supply.

Moreover, various expansion cards may use excessive amounts of power, even when used very little. That is, due to leakage currents, high clock speeds, and the like, even when an expansion card is doing very little actual work or processing, power may be unnecessarily wasted. The use of multiple expansion cards may compound this problem, each consuming more power than is necessary. Situations such as these may easily overload rated power supplied by a bus, such as a PCI bus. Moreover, as various computing components continue to decrease in size while they increase in performance, the need for more power may make the devices larger than is necessary due to battery size.

Thus, apparatus and methods are needed to regulate, allocate, and control power provided to devices, such as expansion and add-on cards connected within a computer system. Apparatus and methods are further needed to adjust device parameters such as clock speed, logic wait states, and the like within an expansion or other device to decrease the power required by such devices.

SUMMARY OF THE INVENTION

In view of the foregoing, the present invention provides apparatus and methods for regulating, allocating, and controlling power provided to devices, such as expansion and add-on cards connected in a computer system. In addition, apparatus and methods capable of adjusting device parameters such as clock speed, logic wait states, and other parameters of expansion or other devices to decrease power used in a computer system are provided.

In accordance with the invention as embodied and broadly described herein, an apparatus for regulating power allocated to components within a computer system is disclosed. In one embodiment of the present invention, the apparatus includes a sensor configured to sense power drawn by a first device within a computer system. A power-monitoring module is provided to monitor the power drawn and functional demand required of the first device. A system control module, operably coupled to the power-monitoring module, is provided to regulate power allocated to the first device by optimizing use of resources associated with the device in accordance with the functional demand of the first device. A second device may operate with power thresholds determined in part by parameters of the first device. For instance, heavy current use of demand on the first device may be sensed and the power usage of the first device reduced.

In selected embodiments, a second sensor is provided to sense power drawn by a second device within the computer system. The system control module is further configured to regulate power allocated to the second device by optimizing use of resources associated with the device in accordance with the functional demand of the second device. In certain embodiments, device resources include a processor, a memory device, a device clock, or other components. The sensor may sense current drawn or voltage characteristics of the power drawn.

In selected embodiments, the first and second devices are PCI expansion cards, ISA expansion cards, onboard devices on a motherboard, or a combination thereof. In fact, the first and second devices may be expansion or add-on cards or devices connected to any type of high-speed bus or point-to-point switching system including multiple devices.

In selected embodiments, the power-monitoring module or the system control module may be located on an expansion card, independent from an expansion card, on a motherboard, or on a device connected to an expansion card. The system control module may perform tasks such as shutting off power to devices when functional demand drops below a specified threshold, decreasing the clock speed of selected components when functional demand decreases, increasing the clock speed of selected components when functional demand increases, introducing wait states into logic when functional demand decreases, increasing supplied power when functional demand increases, and decreasing supplied power when functional demand decreases.

In another aspect of the invention, a method for regulating power allocated to components within a computer system includes sensing power drawn by a first device within a computer system, the first device having device resources needed to satisfy functional demand required of the first device, monitoring the power drawn and functional demand required of the first device, and regulating power allocated to the first device by optimizing use of the first device resources in accordance with the functional demand of the first device.

In another aspect of the invention, a system for regulating power allocated to components within a computer system includes a computer system comprising a processor, main memory, a local bus, and an expansion bus for receiving expansion cards. A first sensor is provided to sense power drawn by a first expansion card operably connected to the expansion bus. A second sensor is provided to sense power drawn by a second expansion card connected to the expansion bus. A system control module is provided to regulate power allocated to the first expansion card and optimize use of resources in accordance with the functional demand of the first expansion card. The system control module is further configured to regulate power allocated to the second expansion card by optimizing use of the device resources in accordance with the functional demand of the second expansion card.

BRIEF DESCRIPTION OF THE DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings in which.

DETAILED DESCRIPTION OF THE INVENTION

It will be readily understood that the components of the present invention, as generally described and illustrated in the Figures herein, could be arranged and designed in a wide variety of different configurations. Thus, the following more detailed description of the embodiments of systems and methods in accordance with the present invention, as represented in FIGS. 1 through 6, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
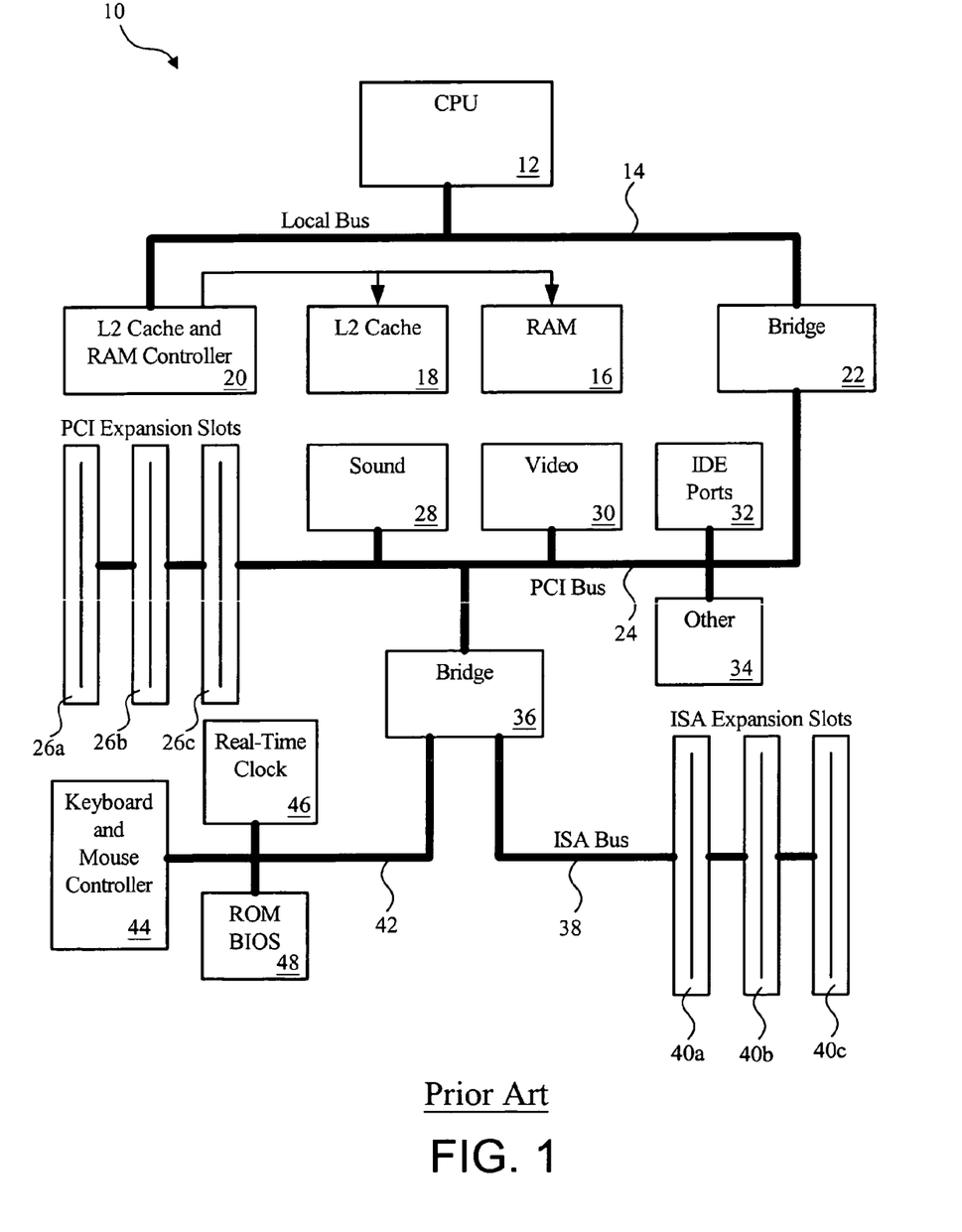
FIG. 1 is a high-level schematic block diagram illustrating one embodiment of selected components within a computer system, including expansion slots provided to accommodate expansion cards or add-on devices.

Referring to FIG. 1, a computer system 10, such as a personal computer 10, a workstation 10, a server 10, or other computer 10 may include various components providing various functionalities thereto. For example, a computer system 10 may include a central processing unit 12 to process executable and operational data stored in a connected memory device such as random access memory 16, or a hard drive connected to an IDE port 32. The CPU 12 may be connected to a main or local bus 14 having a relatively large bandwidth to accommodate the speed of the CPU 12. The local bus 14 maybe connected to various high-speed memory devices 16, 18 where instructions and operational data may be stored for ready and immediate access by the CPU 12.

A controller 20 may act as an interface between the CPU 12 and the memory 16, 18. For example, local memory may include an L2 cache 18 and random access memory 16. The L2 cache 18 may be used to speed up data transfers between the CPU 12 and random access memory 16. The L2 cache 18 may also serve as a staging area to speed up instruction execution and data retrieval.

The local bus 14 may connect to a bridge 22 acting as an interface between the local bus 14 and other buses, such as a PCI bus 24. The bridge 22 may function as an arbitrator or "traffic cop" for data exchanges between the buses 14, 24, and may resolve differences in protocols, clock speeds, and the like between the buses 14, 24.

A bus, such as a PCI bus 24, may be used to interconnect, switch, or multiplex data exchanged between various onboard devices 28, 30, 32, 34, as well as add-on or expansion cards installed into one or several expansion slots 26a–c. For example, a secondary bus 24, such as a PCI bus 24, may support sound hardware 28, video hardware 30, IDE ports 32 for interfacing with hard drives or other storage devices, or any other number of components 34.

In a similar manner, a secondary bus 24, such as a PCI bus 24, may connect to one or more other bridges 36 for interfacing with other buses 38, 42, or components. The bridge 36 may interface with other slower legacy buses having lower bandwidths. A legacy bus 38, 42 may serve to interface with older, but still useful, expansion cards, or other components 44, 46, 48. For example, a bridge 36 may connect to an ISA bus 38 (Industry Standard Architecture) that accepts many slower legacy expansion cards 40*a–c*. The bridge 36 may also connect via a bus 42 to devices such as a real-time clock 46 that may store the current time and date even when the computer system 10 is powered off.

Other devices in the computer system 10 may include non-volatile memory 48 storing a basic input output system 48 (BIOS) to provide an interface between an installed operating system and hardware in the computer system 10. Other devices may include a keyboard and mouse controller 44, or other controllers 44, providing basic input and output functionality to external device such as mice, keyboards, and the like.

Referring again to the secondary bus 24, the secondary bus 24 may be rated to supply a specified amount of power to each of the devices 26*a–c*, 28, 30, 32, 34. Nevertheless, as selected components such as expansion cards include greater performance, these components may draw more power than the bus 24 is rated to supply. Thus, situations may frequently occur in which the bus 24 is overloaded beyond its power rating.

Moreover, in certain instances, expansion cards inserted into expansion slots 26*a–c*, as well as other devices 28, 30, 32, 34, may draw more power than the functional demand on the devices requires at any given time. That is, a component connected to the bus 24 may draw a certain level of power regardless of the load or demand imposed on the device.

For example, a network card installed into an expansion slot 26 may only intermittently be operating at its full functional capability, such as when data or files are accessed over a network, or a user is accessing the Internet or other network services by way of the network card. Nevertheless, when the network card is not being used, the network card may continue to draw power, even though in a rest state. This may be due to clock speeds that continue to operate at high speeds needlessly, or because of leakage currents that occur within circuitry or components of the network card, even when at rest. Thus, it would be an improvement in the art to regulate, shut off, increase, or decrease power supplied to an expansion card or other device as power is required by functional demand on the device. It would be a further advance to actually adjust device parameters such as clock speeds, logic wait states, and the like, to reduce power drawn by a selected device.

Figure 2:
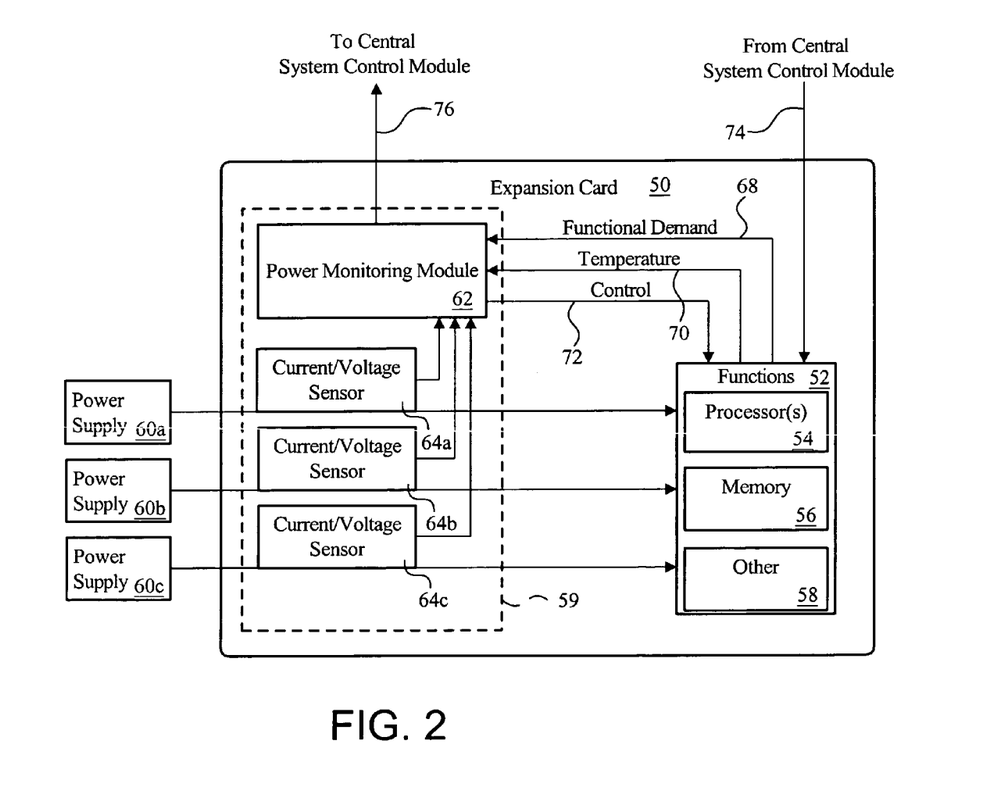
FIG. 2 is a schematic block diagram illustrating one embodiment of an expansion card including a power-monitoring module configured to monitor power consumption and functional demand of the expansion card.

Referring to FIG. 2, in selected embodiments, supplemental hardware 59, such as a power-monitoring module 62, is located on an expansion card 50 or other device 50 connected to a bus 24, to monitor power drawn by the device 50. One or several sensors 64*a–c* may be used to monitor power used by the device 50 supplied by one or several power supplies 60*a–b*. The power-monitoring module 62 may monitor and relay the power drawn by the device 50 to a central system control module by way of a signal 76. The sensors 64*a–c* may sense the current, the voltage, or the like, drawn by the device 50.

In selected embodiments, the power-monitoring module 62 also preferably monitors the functional demand 68 required of selected functional components 52 of the expansion card 50 or device 50. For example, functional components 52 of the device 50 may include one or several processors 54, memory devices 56, or other components 58. The power-monitoring module 62 may also monitor various characteristics of the expansion card's functions 52, such as temperature 70, or the like. In selected embodiments, the power control module 62 may output a control signal 72 to the functional components 52 of the expansion card 50 to control or change device parameters of the processor 54, memory 56, or other components 58. In other embodiments, a control signal 74 may be received from a central system control module directly to the functional components 52 of the device to modify clock speed and the like.

Figure 3:
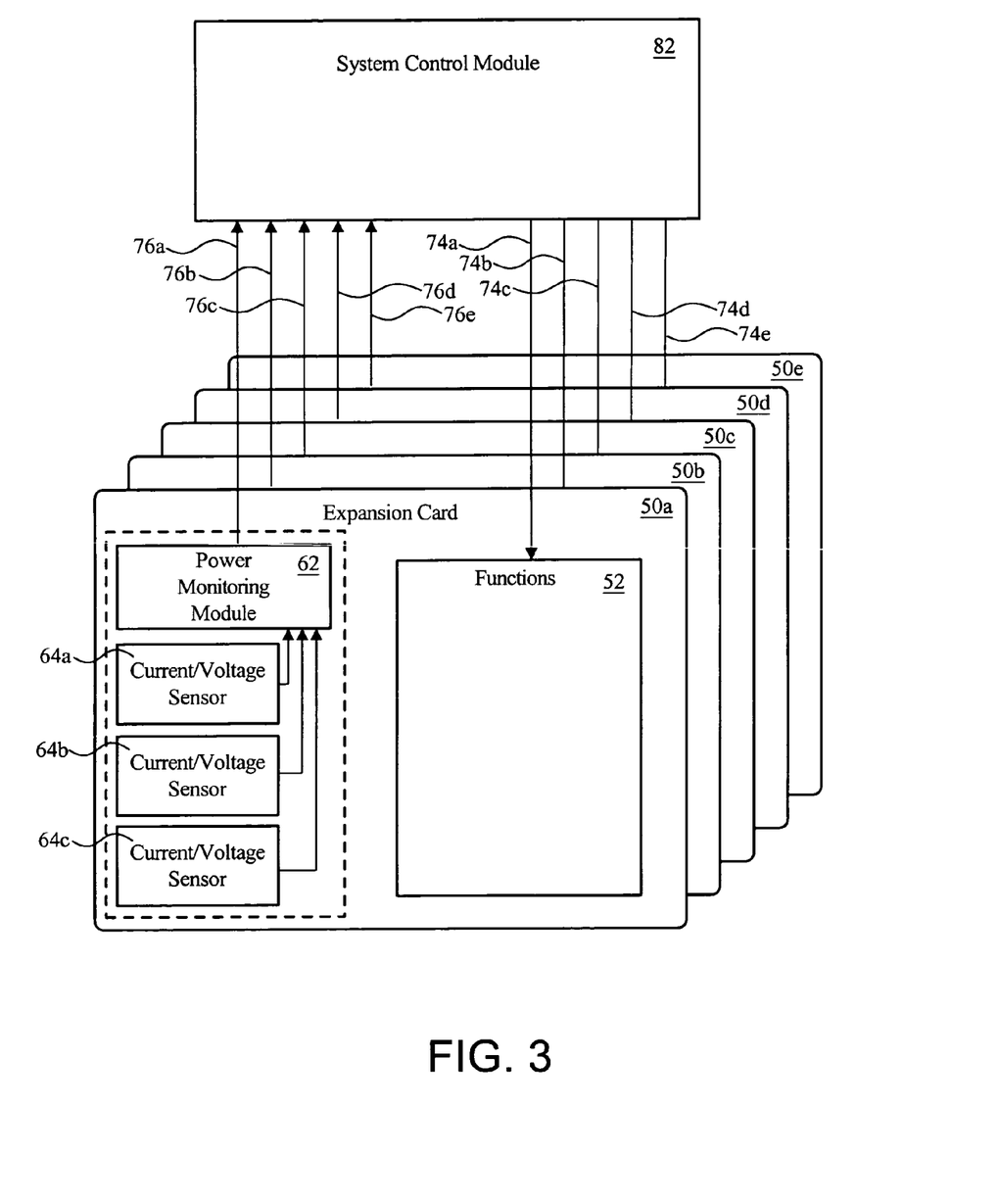
FIG. 3 is a schematic block diagram illustrating one embodiment of a system control module used to regulate power allocated to multiple expansion cards within a computer system.

Referring to FIG. 3, a system control module 82 is preferably used to monitor a plurality of expansion cards 50*a–e* and output control signals 74*a–e* to control functions of each card 50*a–e*. For example, in one embodiment, a power-monitoring module 62 may be provided for each expansion card 50 or device 50 to gather information with respect to the power consumed, and characteristics of the functional components 52 of each card 50*a–e*.

In selected embodiments, the system control module 82 may be embodied as one or more pieces of hardware located on a motherboard, or other device. The functionality of the system control module 82 may also be provided by a combination of hardware and software, and may be executed by a CPU 12 of the computer system 10. Likewise, as illustrated, one or several power-monitoring modules 62 may be located directly on each expansion card 50 or, in other embodiments, may be located at a location off the card 50. Likewise, the current or voltage sensors 64*a–c* may be located directly on the card 50 or, in other embodiments, may be located off the card 50 such as on a motherboard, to monitor power drawn by one or several expansion cards 50*a–e*.

As illustrated, the system control module 82 is used to monitor and control one or several expansion cards 50*a–e* located on a secondary bus 24, such as a PCI bus 24. However, the system control module 82 may also be used to monitor and control power used by other devices 28, 30, 32, 34 permanently connected to the bus 24. In addition, apparatus and methods in accordance with the invention need not be limited to buses 24, such as PCI buses 24, but may be used with any bus or grouping of components for which power control is desired. For example, apparatus and methods in accordance with the invention may be used to monitor and control power used by components in a next generation point-to-point switching system.

As illustrated in FIG. 3, the system control module 82 preferably receives input signals 76*a–e* with respect to the power consumed and the functional demand of each of the expansion cards 50*a–e*. The system control module 82 may also provide one or several control signals 74*a–e* to control, modify, or optimize selected functional components 52 of the devices 50.

Figure 4:
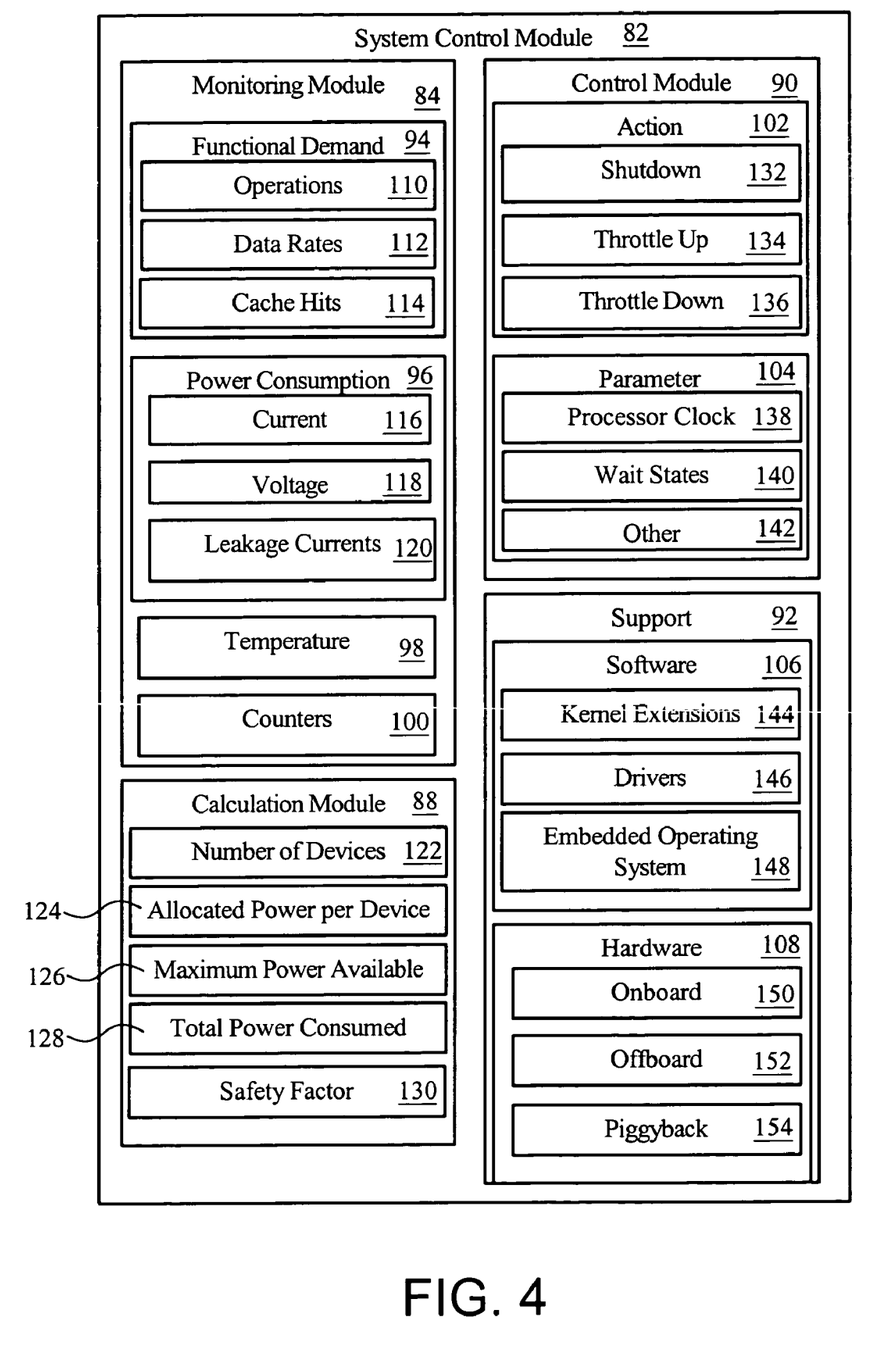
FIG. 4 is a schematic block diagram illustrating selected embodiments of functional modules providing functionality to the system control module.

Referring to FIG. 4, a system control module 82 in one embodiment includes a monitoring module 84 to monitor device parameters or characteristics of various expansion cards 50 or devices 50 in a computer system 10, a calculation module 88 to perform various calculations with respect to the power consumption and control of the expansion cards 50, a control module 90 to control various device parameters or characteristics of the expansion cards 50 or other devices 50, and a support module 92 providing functionality to the system control module 82. In reality, any of the functions described with respect to the modules 84, 88, 90, 92 may be located within the system control module 82 or the power-monitoring module 62, either being within the scope of the invention. Thus, the functionality, rather than the location of the modules 84, 88, 90, 92, is intended to be captured by this description.

For example, a monitoring module 84 may monitor both the functional demand 94 required of a device 50, and the power consumed 96 by the device 50. By "functional demand," it is meant the functional load or processing required by a particular device 50. In selected embodiments, functional demand 94 may be measured by the number, frequency, peak values, and the like, of operations 110 that are performed by a processor 54 or other component 58 of an expansion card 50 or device 50. Functional demand 94 may also be measured by monitoring data rates 112 transmitted to or from the expansion card 50 or other device 50.

In other embodiments, a cache hit ratio 114 may be used to measure the functional demand 94. A cache hit ratio 114 refers to the ratio between the number of occurrences that data is found in a component's data cache compared to the total number of attempts to access data in the data cache. Likewise, other benchmarks or measurements may be used to measure the functional demand 94 for a selected device 50.

The monitoring module 84 may also monitor the power consumed by a device 50 or expansion card 50. The power consumed 96 may be determined by measuring current 116 drawn by the device 50, or by measuring fluctuations in voltage 118 due to power drawn. The monitoring module 84 may also measure leakage currents 120 of selected devices 50. Leakage currents 120 may be measured by observing the current or power drawn by a device 50 when the functional demand 94 is zero or substantially zero. In situations such as these, it may be desirable to completely shut off a device 50, or shut down selected components 54, 56, 58 within a device 50, in order to save power.

In other embodiments, the monitoring module 84 may measure the temperature 98 of a device 50 to calculate the amount of power being consumed by a particular device 50. The temperature may then be compared to suitable operating values to determine if it is in range. If it is out of range, the power allocated to one or more of the devices may be reduced. Thus, temperature monitoring may be used in throttling back selected devices with lower functional demands to reduce the temperature in the entire system.

In certain embodiments, counters 100 may be used to determine the functional demand 94 imposed on a particular device 50, or power consumed 96 by a device 50. For example, a counter 100 may be used to count the number of operations 110 performed by a selected device 50, quantities or speeds of data processed by a device 50, numbers of hits 114 to a device's cache compared to the number of times data was actually found in the cache, and the like.

In selected embodiments, the system control module 82 includes a calculation module 88 configured to perform various calculations with respect to the optimization of power allocated to various devices 122. For example, a calculation module 88 may determine the number of devices 50 that are sharing a finite quantity of power. As expansion cards 50 or other devices 50 are added or removed from a computer system 10, the calculation module 88 may determine the impact or affect this may have on the overall power consumption of the devices 50. In certain embodiments, a calculation module 88 may reallocate power resources as the number of devices 122 changes.

The calculation module 88 in selected embodiments also determines the amount of power that is allocated 124 to each device 50. Thus, if a device 50 exceeds the allocated power 124, measures may be taken to correct this condition or to compensate by allocating additional power. In selected embodiments, the calculation module 88 may calculate the maximum or total power 126 that is available. That is, if the functional demand 94 on a selected device 50 increases such that it requires additional power, the calculation module 88 may allocate additional power based on the power available 126. If the maximum power available 126 has been allocated, the calculation module 88 may prevent a selected device 50 from drawing additional power. Instead, power from another device 50 may be allocated to the selected device 50.

In other embodiments, the calculation module 88 may calculate the total power consumed 128 by individual devices 50, several devices 50, or all devices 50 drawing power on a selected bus 24. The calculation module 88 may also calculate a safety factor 130. A safety factor 130 may be a level of power allocated to a particular device 50 in excess of what is actually required by the functional demand 94 on the device 50. Thus, in situations where a surge or rapid fluctuation of power is needed to satisfy an increase in functional demand 94, a safety factor 130 may ensure that power is available.

In selected embodiments, the system control module 82 may include a control module 90. The control module 90 may have the primary task of controlling, adjusting, and optimizing device parameters of various components such as a processor 54, a memory device 56, or other component 58 providing functions 52 to an expansion card 50 or device 50. For example, a control module 90 may direct a selected action 102 toward a parameter 104.

Actions 102 may include shutting down 132 a device 50 or components 54, 56, 58 of a device 50, throttling up 134 selected device parameters 104, or throttling down 136 selected device parameters 104. For example, the control module 90 may shut down 132, throttle up 134, throttle down 136, or the like, a processor clock 138 driving a processor 54, introduce wait states 140 in logic, or adjust other components 142 such as bus speeds, as needed. Those parameters 104 illustrated simply represent certain examples of device parameters that may be modified or adjusted and are not an exhaustive list of all device parameters that may adjust the power consumed by a selected expansion card 50 or other device 50.

A system control module 82 may receive support 92 from a variety of sources. For example, support 92 may be provided by software 106 and hardware 108 to provide necessary functionality to the system control module 82. For example, in selected embodiments, any or all of the modules within the system control module 82 may be implemented by kernel extensions 144 to an operating system run on a computer system 10, drivers 146 driving selected hardware, or embedded operating systems 148 loaded onto microcontrollers, field programmable gate arrays, and the like.

Hardware 108 used to implement the system control module 82 may be on-board 150, meaning it is located on any of the expansion cards 50 or devices 50, and/or off-board 152, meaning it is located on other devices such as a computer system motherboard. The hardware may be implemented as piggyback 154 hardware attached or plugged into a device 50 or expansion card 50. Indeed, any number of solutions using hardware 108, software 106, or a combination thereof, may be used to implement an apparatus and method in accordance with invention, the primary concept being the control and conservation of power allocated to one or several devices 50 in a computer system 10.

Figure 5:
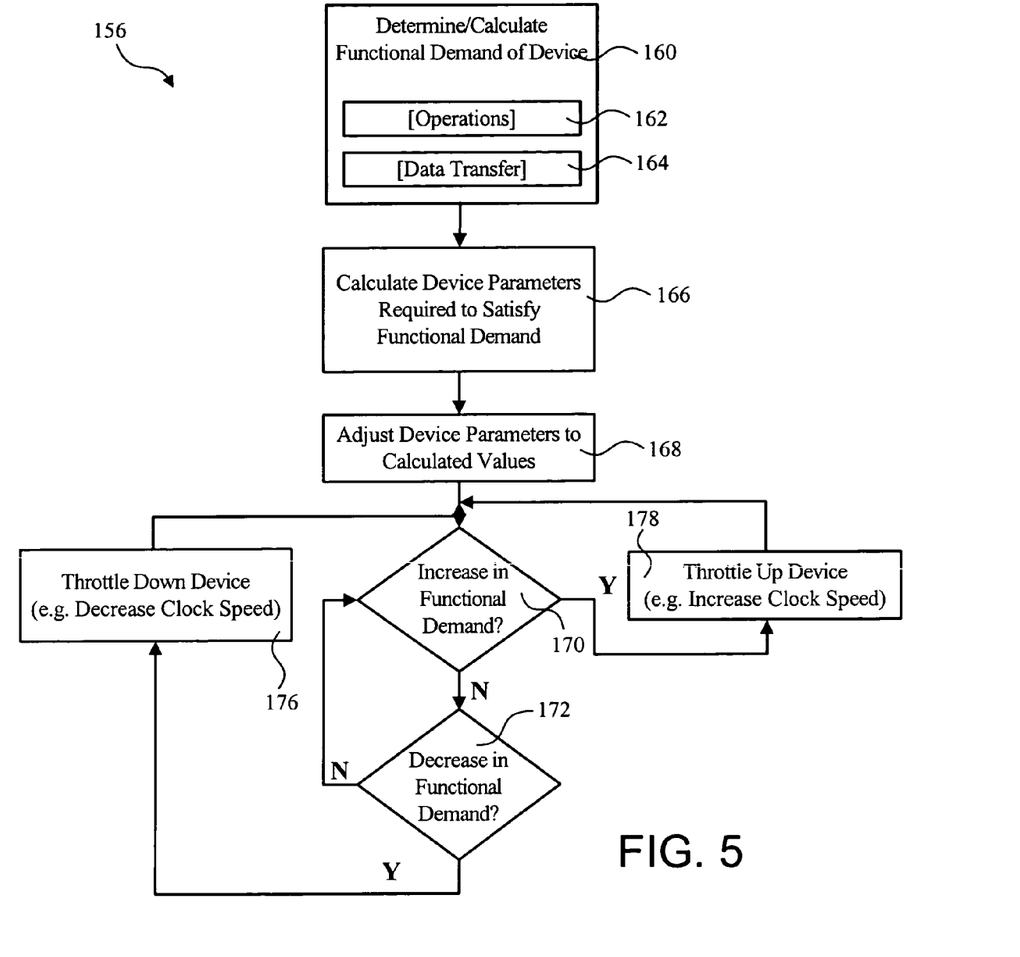
FIG. 5 is a flow chart illustrating one embodiment of a process used to adjust and allocate power to various components and expansion cards connected to a bus.

Referring to FIG. 5, in selected embodiments, a process 156 in accordance with the present invention includes determining 160 or calculating 160 the functional demand of a selected device 50. For example, calculating 160 functional demand may include measuring the number, frequency, or speed of operations 162 performed by a selected device 50, or measuring the quantity or speed of data transferred 164 to or from a device 50 or expansion card 50. A process 156 may further include calculating 166 device parameters 104 needed to satisfy the calculated functional demand.

As mentioned above, device parameters 104 may include parameters such as clock speed, bus speed, logic wait states, and the like, that may be adjusted to reduce the power consumed by a device 50. Once required device parameters 104 have been calculated, a process 156 may adjust 168 the device parameters to the calculated values. This may include increasing or reducing clock speeds, bus speeds, introducing wait states into logic, and the like, to agree with the calculated values.

Once the device parameters have been adjusted 168, the process 156 continues and determines 170 whether an increase in the functional demand of one or more devices 50 has occurred. For example, if it is determined that the functional demand of one of the devices 50 has increased, a process 156 may throttle up 178 the device to accommodate the increase in functional demand. Throttling up one device may require throttling down another device which has a reduced demand. Once the device parameters have been adjusted 178, the process 156 may return to the determination 170.

If, the functional demand has not increased, the process 156 continues on to determine 172 if functional demand has on one or more of the devices has decreased. If functional demand has decreased, the process 156 may throttle down 176 one or more of the devices 50 and return to the determination 170. If, however, functional demand has not decreased, the process 156 may continue directly to determination 170. Thus, if neither an increase nor a decrease in functional demand has occurred, the process 156 may simply cycle between determination 170 and determination 172 until an increase or decrease occurs.

Consequently, the level of demand or power drawn by one device may affect the adjustment of power drawn by the other devices. If one device experiences a high demand or a high level of power usage, power levels or other operating parameters in others of the devices experiencing a lesser demand may be decreased. In one embodiment, the total power drawn is kept under a selected level, while adjusting the various devices according to the functional demand on the devices.

Multiple dependent thresholds may be provided between the devices to allocate power between the devices according to various selected criteria. Parameters such as current power usage, anticipated power usage, functional demand, and temperature may be examined for each card to determine the criteria. These parameters are compared against predetermined threshold levels to allocate power between the multiple devices. Thus, the devices may be collectively adjusted according to multiple dependent thresholds.

The monitoring of the devices may also be used to isolate a failure or pending failure to a device in the system. By comparing a vector of the current power, temperature, and functional demand to a set of stored vector ranges, a failure can be predicted or isolated to a device when the values fall outside a predetermined range. For example, when temperature on a card is higher than expected for the demand and power values reported, a failure or pending failure may be indicated and power to the device terminated.

Figure 6:
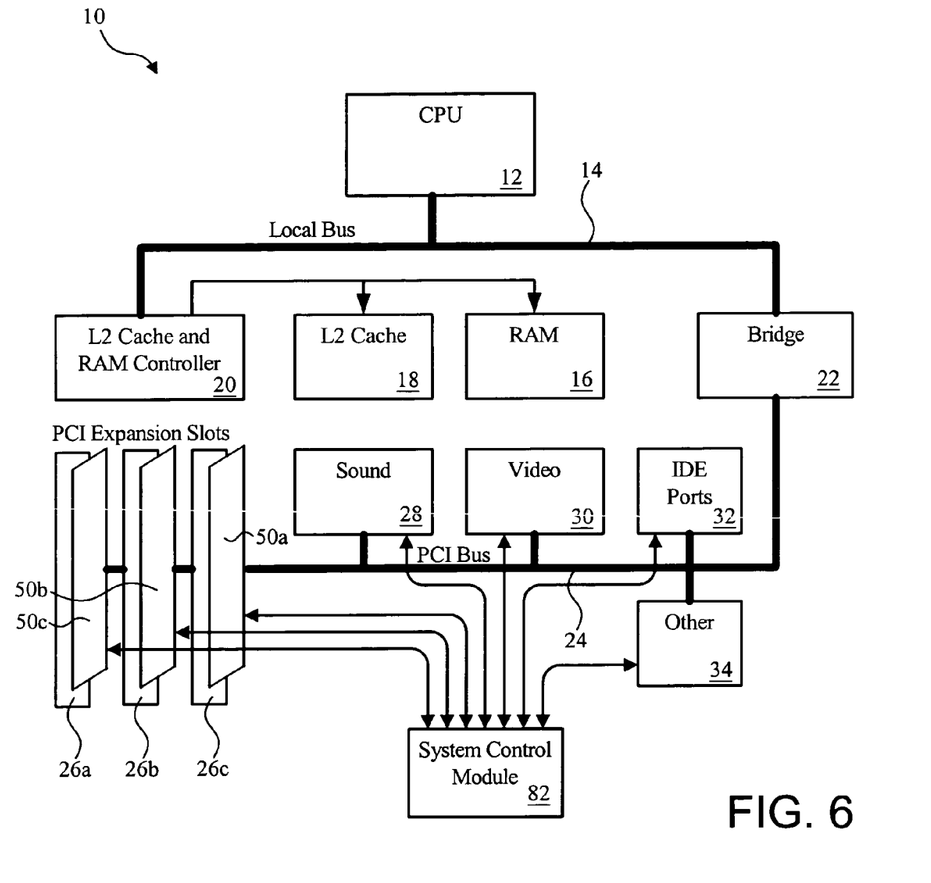
FIG. 6 is a schematic block diagram illustrating one embodiment of a system control module used to allocate and control power to various expansion cards and other permanent devices connected in a computer system.

Referring to FIG. 6, in one contemplated embodiment given by way of example, a system control module 82 is used to monitor and control functional parameters and power consumed by one or several expansion cards 50a–c, and devices such as sound hardware 28, video hardware 30, IDE ports 32 used to access devices such as hard drives, or other devices 34 that may be connected to a bus 24 like a PCI bus 24.

The system control module 82 may be implemented exclusively by hardware located in the computer system 10, or may be implemented by a combination of hardware and software loaded onto the computer system 10. Those skilled in the art will recognize that an apparatus and method in accordance with the invention need not be limited to buses 24, such as PCI buses 24, ISA buses 38, or other buses available currently or in the future, but may be used in any system comprising multiple devices 50 or components 50 sharing power from a single power supply or power source.

Thus, the system control module 82 may be used to conserve and allocate power in a wide variety of computer systems 10. The examples illustrated have primarily been descriptive of selected personal computers 10, workstations 10, and the like. However, an apparatus and method in accordance with the invention may be used in higher-end computers such as servers, mainframe computers, and the like, all within the scope of the present invention.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed is:

1. An apparatus for regulating power allocated to components within a computer system, the apparatus comprising:
   a plurality of sensors configured to sense power drawn by a corresponding plurality of devices within a computer system, each device thereof having device resources needed to satisfy a functional demand required of the plurality of devices, wherein a particular device of the plurality of devices comprises a cache memory and the functional demand required of the particular device includes a cache hit ratio;
   at least one monitoring module in communication with the plurality of sensors and configured to monitor the power drawn by, and the functional demand required of, the plurality of devices; and
   a system control module configured to regulate a total power consumed by the plurality of devices by optimizing use of the device resources in response to the determination of the power drawn by, and the functional demand required of, the plurality of devices.

2. The apparatus of claim 1, the system control module is further configured to regulate power to a second device at least partially in accordance with a parameter of a first device.

3. The apparatus of claim 2, wherein the system control module is further configured to adjust the power levels in the first and second devices in accordance with multiple dependent thresholds determined by the respective functional demands of the first and second devices.

4. The apparatus of claim 2, wherein the parameter of the first device comprises the functional demand of the first device.

5. The apparatus of claim 2, wherein the first and second device resources include at least one of a processor, a memory device, and a device clock.

6. The apparatus of claim 2, wherein the first and second devices are selected from the group consisting of PCI expansion cards, ISA expansion cards, expansion cards connected to a high-speed bus, onboard devices on a motherboard, and a combination thereof.

7. The apparatus of claim 2, wherein at least one of the power-monitoring module and the system control module is located in a location selected from the group consisting of on an expansion card, independent from an expansion card, on a motherboard, and on a device connected to an expansion card.

8. The apparatus of claim 2, wherein the system control module is configured to control the first and second devices by at least one action selected from the group consisting of shutting off power when functional demand drops below a specified threshold, decreasing the clock speed of selected components when functional demand decreases, increasing the clock speed of selected components when functional demand increases, introducing wait states into logic when functional demand decreases, increasing supplied power when functional demand increases, and decreasing supplied power when functional demand decreases.

9. The apparatus of claim 2, wherein the system control module is further configured to maintain total power consumption of the first and second devices below a selected level.

10. The apparatus of claim 2, wherein at least one of the power-monitoring module and the system control module include functionality provided by modules selected from the group consisting of hardware, software, kernel extensions, drivers, and embedded operating systems.

11. The article of manufacture of claim 10, wherein optimizing further comprises at least one action selected from the group consisting of decreasing the clock speed of selected components when functional demand decreases, increasing the clock speed of selected components when functional demand increases, and introducing wait states into logic when functional demand decreases.

12. The apparatus of claim 1, wherein the system control module is further configured to receive an indication of the temperature of a first device of the plurality of devices and regulate power to the first device in accordance with the indication of temperature and at least one other parameter.

13. The apparatus of claim 12, wherein the system control module is configured to examine parameters of the first device including temperature, power, and functional demand; to determine a malfunction of the first device in response to the examination of the parameters; and to reduce power transmitted to the first device in response to the determination of a malfunction.

14. The apparatus of claim 1, wherein the functional demand required of a device is selected from the group consisting of a number of operations performed, a frequency of operations performed, a peak value of operations performed, a data transfer rate, and a cache hit ratio.

15. An article of manufacture comprising a program storage medium readable by a processor and embodying one or more instructions executable by a processor to perform steps of a method for regulating power allocated to components within a computer system, the method comprising:

sensing power drawn by a plurality of devices within a computer system, each device thereof having device resources needed to satisfy a functional demand required of the plurality of devices, wherein a particular device of the plurality of devices comprises a cache memory and the functional demand required of the particular device includes a cache hit ratio;

monitoring the power drawn by, and the functional demand required of, the plurality of devices; and regulating a total power consumed by the plurality of devices by optimizing use of the device resources in response to the determination of the power drawn by, and the functional demand required of, the plurality of devices.

16. The apparatus of claim 15, further comprising adjusting the power levels in a first and a second device of the plurality of devices in accordance with multiple dependent thresholds determined by the respective functional demands of the first and second devices.

17. The article of manufacture of claim 15, wherein the method further comprises regulating power allocated to a second device of the plurality of devices by optimizing use of the second device resources in accordance with the functional demand of the second device.

18. The article of manufacture of claim 15, wherein the device resources include at least one of a processor, a memory device, and a device clock.

19. The article of manufacture of claim 15, wherein the plurality of devices are selected from the group consisting of PCI expansion cards, ISA expansion cards, expansion cards connected to a high-speed bus, onboard devices on a motherboard, and a combination thereof.

20. The article of manufacture of claim 15, wherein monitoring and regulating are performed on at least one component selected from the group consisting of an expansion card, hardware independent of an expansion card, a motherboard, on a device connected to an expansion card, and a combination thereof.

21. The article of manufacture of claim 15, wherein regulating further comprises at least one action selected from the group consisting of shutting off power when functional demand drops below a specified threshold, increasing supplied power when functional demand increases, and decreasing supplied power when functional demand decreases.

22. The article of manufacture of claim 15, wherein regulating further comprises maintaining total power consumption of the first and second devices below a specified level.

23. A system for regulating power allocated to components within a computer system, the system comprising:

a computer system comprising motherboard, the motherboard comprising a processor, a main memory, a cache, a local bus, and an expansion bus for receiving expansion cards;

a first sensor configured to sense power drawn by a first expansion card operably connected to the expansion bus, the first expansion card having first resources needed to satisfy functional demand required of the first expansion card;

a second sensor configured to sense power drawn by the motherboard, the motherboard having second resources needed to satisfy a functional demand required of the motherboard wherein the functional demand includes a cache hit ratio for the motherboard; and a system control module communicating with the first sensor and the second sensor and configured to regulate power allocated to the first expansion card and optimize use of the first resources in accordance with the functional demand of the first expansion card, and to regulate power allocated to the motherboard card in accordance the respective functional demands of the motherboard and the first expansion card.

* * * * *